US010050264B2

(12) United States Patent
Kim et al.

(10) Patent No.: US 10,050,264 B2
(45) Date of Patent: Aug. 14, 2018

(54) COMPOSITE NEGATIVE ACTIVE MATERIAL, NEGATIVE ELECTRODE AND LITHIUM SECONDARY BATTERY INCLUDING THE COMPOSITE NEGATIVE ACTIVE MATERIAL, AND METHOD OF PREPARING THE COMPOSITE NEGATIVE ACTIVE MATERIAL

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Guesung Kim, Suwon-si (KR); Jinsoo Mun, Seoul (KR); Heechul Jung, Gunpo-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 307 days.

(21) Appl. No.: 15/072,547

(22) Filed: Mar. 17, 2016

(65) Prior Publication Data

US 2017/0092939 A1    Mar. 30, 2017

(30) Foreign Application Priority Data

Sep. 24, 2015 (KR) .................... 10-2015-0135549

(51) Int. Cl.
*H01M 4/36* (2006.01)
*H01M 4/04* (2006.01)
(Continued)

(52) U.S. Cl.
CPC ......... *H01M 4/366* (2013.01); *H01M 4/0402* (2013.01); *H01M 4/0404* (2013.01);
(Continued)

(58) Field of Classification Search
CPC ...... H01M 4/366; H01M 4/364; H01M 4/134; H01M 4/1395; H01M 4/386; H01M 4/582;
(Continued)

(56) References Cited

U.S. PATENT DOCUMENTS 8,697,282 B2    4/2014   Lee et al.
2011/0097629 A1   4/2011   Yew et al.
(Continued)

FOREIGN PATENT DOCUMENTS

JP    5131429 B2    11/2012
JP    2013-089437 A    5/2013
(Continued)

OTHER PUBLICATIONS

Hema et al., "Structural, vibrational and electrical characterization of PVA-NH4Br polymer electrolyte system", Physica B. 403, 2008, pp. 2740-2747.

*Primary Examiner* — Laura S Weiner
(74) *Attorney, Agent, or Firm* — Cantor Colburn LLP

(57) ABSTRACT

A composite negative active material, and a negative electrode and a lithium secondary battery that include the composite negative active material, and a method of preparing the composite negative active material are disclosed. The composite negative active material includes: a core including a silicon material and a coating layer disposed on the core, wherein the coating layer includes a water-insoluble polymer composite in which at least one anionic component is chemically bonded to a water-soluble polymer, thereby improving lifespan characteristics of the composite negative active material.

18 Claims, 8 Drawing Sheets

(51) Int. Cl.
*H01M 4/134* (2010.01)
*H01M 4/1395* (2010.01)
*H01M 4/38* (2006.01)
*H01M 4/58* (2010.01)
*H01M 4/587* (2010.01)
*H01M 4/60* (2006.01)
*H01M 4/62* (2006.01)
*H01M 10/0525* (2010.01)
*H01M 10/0568* (2010.01)
*H01M 10/0569* (2010.01)
*H01M 10/052* (2010.01)
*H01M 4/02* (2006.01)

(52) U.S. Cl.
CPC ....... *H01M 4/0435* (2013.01); *H01M 4/0471* (2013.01); *H01M 4/134* (2013.01); *H01M 4/1395* (2013.01); *H01M 4/364* (2013.01); *H01M 4/386* (2013.01); *H01M 4/582* (2013.01); *H01M 4/587* (2013.01); *H01M 4/604* (2013.01); *H01M 4/622* (2013.01); *H01M 4/625* (2013.01); *H01M 4/628* (2013.01); *H01M 10/052* (2013.01); *H01M 10/0525* (2013.01); *H01M 10/0568* (2013.01); *H01M 10/0569* (2013.01); *H01M 2004/027* (2013.01); *H01M 2220/20* (2013.01); *H01M 2220/30* (2013.01); *H01M 2300/004* (2013.01); *H01M 2300/0034* (2013.01)

(58) Field of Classification Search
CPC ...... H01M 4/587; H01M 4/604; H01M 4/622; H01M 4/625; H01M 4/628; H01M 10/0525; H01M 10/052; H01M 2004/027
See application file for complete search history.

(56) References Cited

U.S. PATENT DOCUMENTS

2013/0052536 A1 2/2013 Belharouak et al.
2014/0050981 A1 2/2014 Kang et al.

FOREIGN PATENT DOCUMENTS

| KR | 1020090067769 A | 6/2009 |
| KR | 10-1049829 B1 | 7/2011 |
| KR | 101201804 B1 | 11/2012 |
| KR | 1020130134239 A | 12/2013 |
| KR | 1020140034879 A | 3/2014 |
| WO | 2014/123910 A1 | 8/2014 |

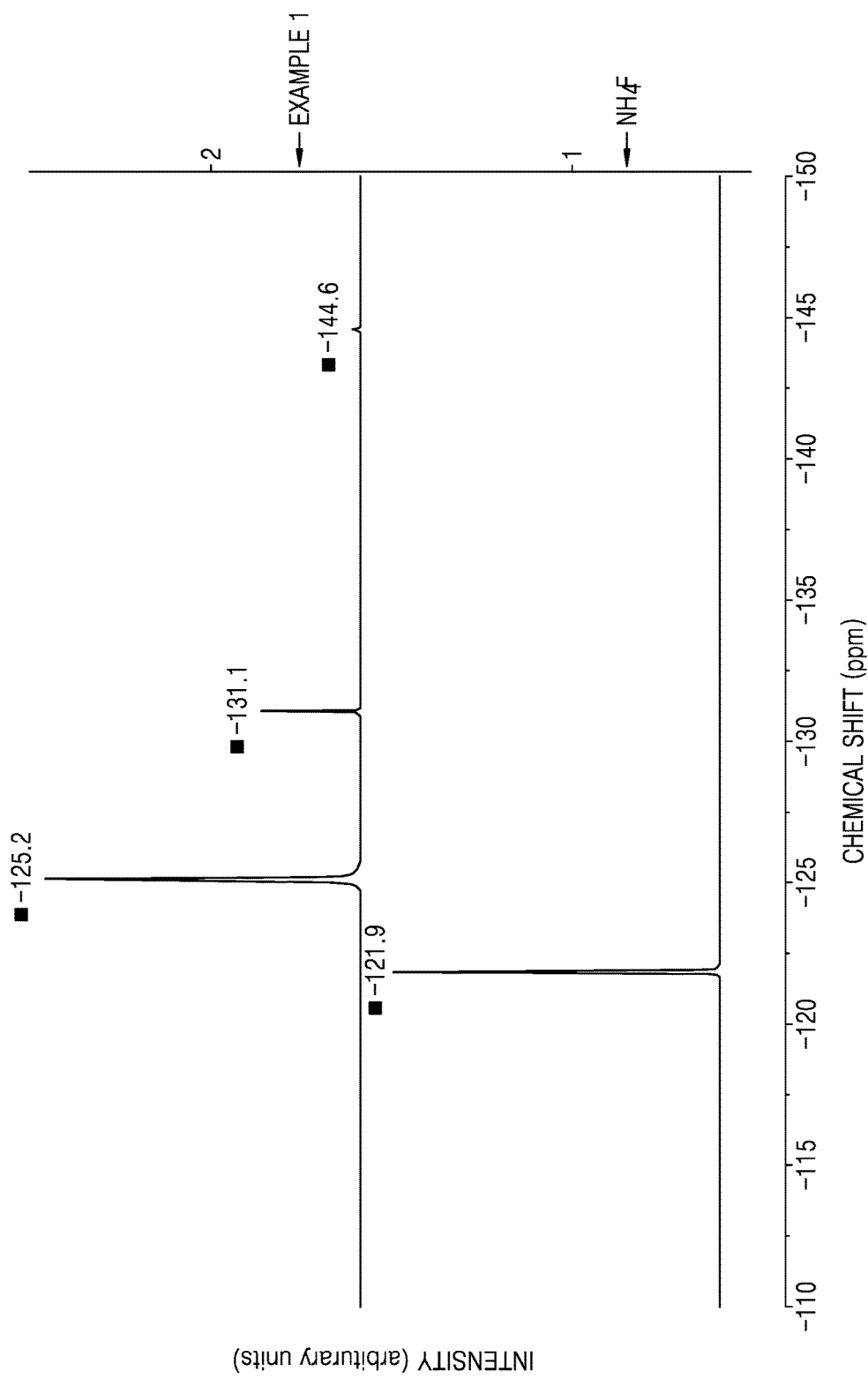

COMPOSITE NEGATIVE ACTIVE MATERIAL, NEGATIVE ELECTRODE AND LITHIUM SECONDARY BATTERY INCLUDING THE COMPOSITE NEGATIVE ACTIVE MATERIAL, AND METHOD OF PREPARING THE COMPOSITE NEGATIVE ACTIVE MATERIAL

CROSS-REFERENCE TO RELATED APPLICATION

This application claims the benefit of and priority to Korean Patent Application No. 10-2015-0135549, filed on Sep. 24, 2015, in the Korean Intellectual Property Office, and all the benefits accruing therefrom under 35 U.S.C. § 119, the disclosure of which is incorporated herein in its entirety by reference.

BACKGROUND

1. Field

The present disclosure relates to a composite negative active material, and a negative electrode and a lithium secondary battery that include the composite negative active material, and a method of preparing the composite negative active material.

2. Description of the Related Art

A silicon-based material has received attention for use as a negative active material for a high-capacity lithium secondary battery (e.g., a battery having a capacity of about 3,570 milliAmpere hours/gram (mAh/g) at room temperature). However, silicon-based materials degrade when cycled. Thus there remains a need for an improved material.

SUMMARY

Provided is a composite negative active material having improved lifespan characteristics.

Provided is a negative electrode including the composite negative active material.

Provided is a lithium secondary battery including the negative electrode.

Provided is a method of preparing the composite negative active material.

Additional aspects will be set forth in part in the description which follows and, in part, will be apparent from the description.

According to an aspect of an exemplary embodiment, there is provided a composite negative active material, the composite negative active material including: a core including silicon; and a coating layer disposed on the core, wherein the coating layer includes a water-insoluble polymer composite including at least one anionic component selected from $F^-$, $PO_4^{3-}$, $PF_6^-$, $BO_3^{3-}$, and $BF_4^-$, wherein the at least one anionic component is chemically bonded to a water-soluble polymer.

According to an aspect of another exemplary embodiment, there is provided a negative electrode, the negative electrode including the composite negative active material described above.

According to an aspect of another exemplary embodiment, there is provided a lithium secondary battery, the lithium secondary battery including the negative electrode described above.

According to an aspect of another exemplary embodiment, there is provided a method of preparing a composite negative active material, the method including: contacting a core including silicon and a first solution containing a water-soluble polymer to obtain a first suspension including an intermediate product; contacting a second solution containing at least one anionic component selected from $F^-$, $PO_4^{3-}$, $PF_6^-$, $BO_3^{3-}$, and $BF_4^-$ and the first suspension comprising the intermediate product to chemically bond the water-soluble polymer to the at least one anionic component to provide a second suspension; and drying the second suspension to prepare the composite negative active material, wherein the composite negative active material includes the core including silicon and a coating layer disposed on the core.

According to an aspect of another exemplary embodiment, there is provided a method of manufacturing a lithium secondary battery, the method including: providing a negative electrode including the composite negative active material described above; disposing a positive electrode on a side of the negative electrode; disposing a separator layer between the negative and positive electrodes to make an electrode stack; inserting the electrode stack into a battery case; inserting an organic electrolyte into the battery case; and sealing the battery case to manufacture the lithium secondary battery.

BRIEF DESCRIPTION OF THE DRAWINGS

These and/or other aspects will become apparent and more readily appreciated from the following description of the exemplary embodiments, taken in conjunction with the accompanying drawings in which:

FIG. 4D is a graph of intensity (arbitrary units) versus chemical shift relative to tetramethyl silane (ppm) showing $^{19}F$ NMR spectra with respect to a composite negative active material prepared according to Example 1 and to $NH_4F$.

DETAILED DESCRIPTION

Figure 1:
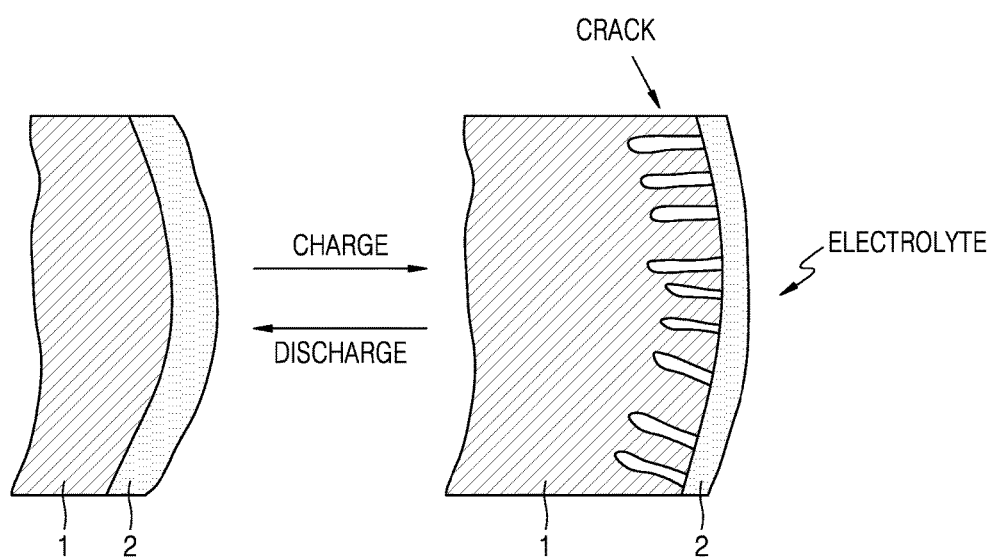
FIG. 1 is a diagram schematically illustrating a shape of a composite negative active material during charge and discharge according to an exemplary embodiment.

Reference will now be made in detail to exemplary embodiments with respect to a composite negative active material, and a negative electrode and a lithium secondary battery that include the composite negative active material, and a method of preparing the composite negative active material, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. "Or" means "and/or." As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The term "silicon-based material" as used herein refers to a material including silicon (Si) in a weight percent of at least about 50%, based on the total weight of the silicon-based material. For example, the silicon-based material may include silicon in a weight percent of at least about 55%, at least about 60%, at least about 65%, at least about 70%, at least about 75%, at least about 80%, at least about 85%, at least about 90%, or at least about 95%. The silicon-based material may include silicon in a weight percent from about 55% to about 100%, from about 65% to about 100%, from about 75% to about 100%, from about 85% to about 100%, and from about 95% to about 100%.

The term "disposed" as used herein refers to attached or placed on top, wherein a component is placed next to and/or close to other components.

The term "water-insoluble" as used herein refers to compositions with water solubility from 0 grams per liter (g/L) to about 0.1 g/L, at a temperature of 25° C.

The term "water soluble" as used herein refers to compositions with water solubility from about 0.1 g/L to about 500 g/L at a temperature of 25° C.

A silicon-based material may undergo a volume expansion of greater than or equal to about 300% during intercalation and deintercalation of lithium ions at room temperature. The volume expansion of the silicon-based material may cause mechanical strain, which is accordingly associated with the degradation of the silicon-based material and difficulties in maintaining a solid electrolyte interphase (SEI) layer. Thus, a negative active material using the silicon-based material may also cause a problem with sudden degradation in charge/discharge characteristics, such as lifespan characteristics of a battery including the negative active material.

The term "polymer" as used herein is inclusive of both homopolymers and copolymers.

To form an SEI layer that is stable to a sudden volume expansion during a charging and discharging process, the study of an electrolyte additive has been widely made. However, when an electrolyte additive is used, a film may be formed on a surface of the negative active material during an initial charging process, which blocks direct contact between an electrolyte and the negative active material and prevents decomposition of the electrolyte.

A silicon-based material undergoes a volume expansion about 300% during intercalation/deintercalation of lithium ions. Accordingly, a binding strength between silicon-based materials is weakened while a lithium secondary battery including the silicon-based material has reduced electrochemical characteristics, such as lifespan characteristics.

A composite negative active material according to an exemplary embodiment includes: a core including a silicon-based material; and a coating layer disposed on the core, wherein the coating layer comprises a water-insoluble polymer composite in which at least one anionic component selected from $F^-$, $PO_4^{3-}$, $PF_6^-$, $BO_3^{3-}$, and $BF_4^-$ is chemically bonded to a water-soluble polymer.

FIG. 1 is a diagram schematically illustrating a shape of a composite negative active material according to an exemplary embodiment.

Referring to FIG. 1, the composite negative active material includes a core including a silicon-based material 1 and an organic coating layer 2 including a water-insoluble polymer composite disposed on the core 1.

While not wanting to be bound by theory, it is believed that composite negative active material including the organic coating layer 2 may prevent an irreversible reaction of lithium ions during intercalation and deintercalation of lithium ions, and may also improve a binding strength between composite negative active materials. In this regard, a lithium secondary battery including the composite negative active material may have improved electrochemical characteristics, such as lifespan characteristics.

The water soluble polymer may include water soluble polyvinyl alcohols, polydiallyldimethyl ammonium chlorides, polydicyandiamides, polyacrylamides, polyacrylates, polyethyleneimines, polyamide amines, polyamines, polyethylene oxides, polyethylene glycols, polyvinylpyrrolidones, carboxymethylcelluloses, hydroxyethyl celluloses, methyl celluloses, or copolymers or combinations of the foregoing.

For example, polyvinyl alcohol is a water soluble polymer, and may have a water solubility of about 100 to about 200 g/L. In some cases a polymer may have water solubility even higher, for example up to 500 g/L, for example about 0.1 g/L to about 500 g/L. The aqueous solubility of polyvinyl alcohol depends on molecular weight, degree of hydrolysis, the presence of other monomers in its structure (as found in a polyvinyl alcohol copolymer), and other characteristics.

The water-soluble polymer may include a polyvinyl alcohol homopolymer or a polyvinyl alcohol copolymer.

The polyvinyl alcohol copolymer may include at least one selected from poly(vinyl alcohol-co-ethylene glycol), poly(vinyl alcohol-co-ethylene), poly(vinyl alcohol-co-nitrile), polyacrylonitrile-grafted polyvinyl alcohol (PAN-g-PVA), poly(vinyl alcohol-co-methyl methacrylate), and poly(vinyl alcohol-co-acrylic acid).

The polyvinyl alcohol homopolymer or copolymer may be a polymer including a carbon-chain backbone that has a hydroxyl group bonded to at least one methylene. The hydroxyl group may serve as a source of a hydrogen bond, which may facilitate formation of the coating layer on a surface of an electrode active material. Thus, the coating layer including the polyvinyl alcohol homopolymer or the polyvinyl alcohol copolymer may have a high tensile strength and an excellent abrasion resistance.

A composite negative active material according to another exemplary embodiment may include, as a coating layer, a water-insoluble polymer composite in which at least one anionic component selected from $F^-$, $PO_4^{3-}$, $PF_6^-$, $BO_3^{3-}$, and $BF_4^-$ is chemically bonded to the polyvinyl alcohol homopolymer or the polyvinyl alcohol copolymer.

The coating layer including the polyvinyl alcohol homopolymer or the polyvinyl alcohol copolymer may have a high tensile strength and good flexibility in spite of a significant volume change of the core including the silicon material during intercalation and deintercalation of lithium ions, and accordingly, the composite negative active material including the coating layer may maintain its stability.

In addition, in the coating layer, the anionic component is chemically bonded to the polyvinyl alcohol homopolymer or the polyvinyl alcohol copolymer, and thus the coating layer may convert characteristics of a water-soluble polymer into characteristics of a water-insoluble polymer composite.

In this regard, when a slurry for forming a composite negative active material is prepared by mixing the composite negative active material including the coating layer with an aqueous binder and is used to prepare a negative electrode, the prepared negative electrode may have a structure that does not collapse. Thus, a lithium secondary battery including the composite negative active material may have improved lifespan characteristics.

The polyvinyl alcohol homopolymer or the polyvinyl alcohol copolymer may have a weight average molecular weight in a range of about 500 Daltons (Da) to about 5,000,000 Da. For example, the polyvinyl alcohol homopolymer or the polyvinyl alcohol copolymer may have a weight average molecular weight in a range of about 500 Da to about 1,000,000 Da. For example, the polyvinyl alcohol homopolymer or the polyvinyl alcohol copolymer may have a weight average molecular weight in a range of about 1,000 Da to about 500,000 Da, or from about 10,000 Da to about 250,000 Da, or from about 50,000 Da to about 200,000 Da.

The coating layer may include a water-insoluble homopolymer composite in which the anionic component as a part of a salt is chemically bonded to the water-soluble polymer.

The salt may include at least one selected from $NH_4F$, $NH_2H_2PO_4$, $NH_4PF_6$, $(NH_4)_3BO_3$, $NH_4BF_4$, and $H_3BO_3$. For example, the salt may include $NH_4F$, $NH_2H_2PO_4$, or a combination thereof.

Figure 2A:
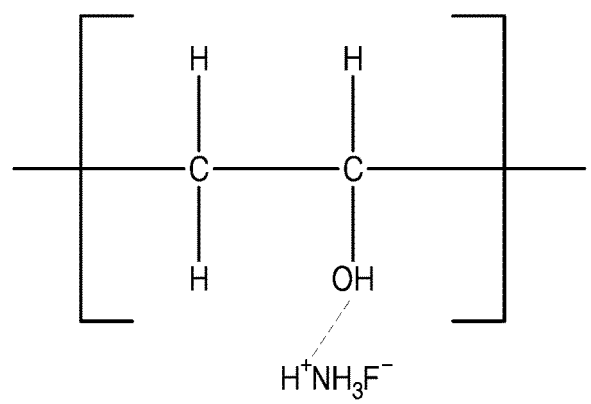
FIGS. 2A and 2B are each a diagram illustrating a chemical structure of a water-insoluble polymer composite including a salt and an F component as a part of the salt, wherein the salt is chemically bonded to a polyvinyl alcohol homopolymer or a polyvinyl alcohol copolymer included in a coating layer of the composite negative active material of FIG. 1.
Figure 2B:
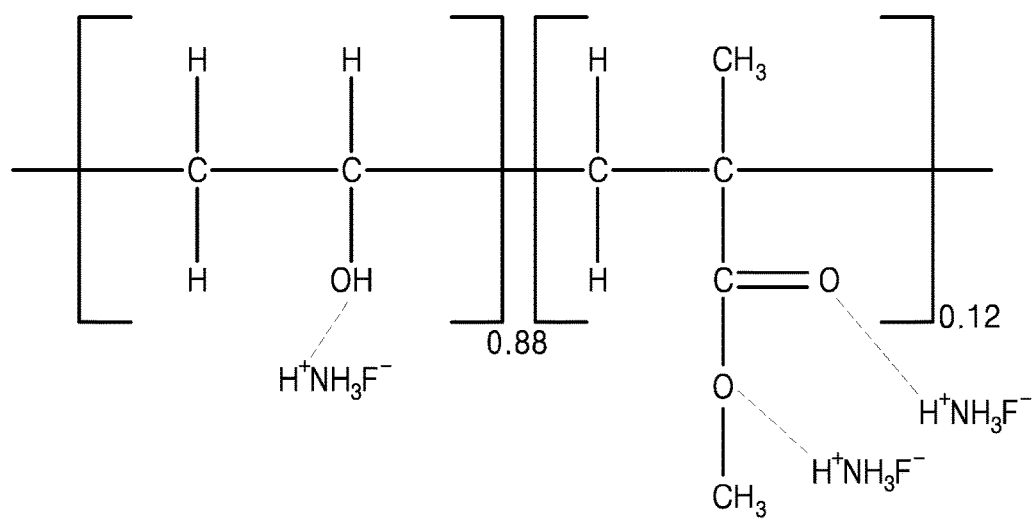

FIGS. 2A and 2B are each diagrams illustrating a chemical structure of the water-insoluble polymer composite including a salt and an F component as a part of the salt, wherein the salt is chemically bonded to a polyvinyl alcohol homopolymer or a polyvinyl alcohol copolymer included in a coating layer of the composite negative active material of FIG. 1.

Referring to FIG. 2A, a hydroxyl group of the polyvinyl alcohol homopolymer forms a hydrogen bond with $H^+$ of a cation ($NH_4^+$) of a $NH_4F$ salt, wherein the cation $NH_4^+$ forms an ionic bond with an anionic component such as $F^-$.

Referring to FIG. 2B, a hydrogen bond is formed between $H^+$ of the cation $NH_4^+$ of the $NH_4F$ salt and —C=O of the polyvinyl alcohol copolymer, such as poly(vinyl alcohol-co-methyl methacrylate), and between $H^+$ of the cation $NH_4^+$ of the $NH_4F$ salt and —O of the polyvinyl alcohol copolymer, wherein the cation $NH_4^+$ forms an ionic bond with an anionic component, such as $F^-$.

In the polyvinyl alcohol homopolymer and/or the polyvinyl alcohol copolymer, the anionic component, such as $F^-$, bonded as a part of the $NH_4F$ salt forms a strong bond, such as a hydrogen bond and an ionic bond, with the polyvinyl alcohol homopolymer and/or the polyvinyl alcohol copolymer, thereby forming the coating layer disposed on the core including the silicon-based material and having a high tensile strength and good flexibility.

The coating layer may further include, in addition to the water-insoluble polymer composite, at least one anionic component selected from $F^-$, $PO_4^{3-}$, $PF_6^-$, $BO_3^{3-}$, and $BF_4^-$ derived from the salt above.

The coating layer may be uncarbonized. The uncarbonized coating layer may have more flexible characteristics, specifically during intercalation and deintercalation of lithium ions.

The core including the silicon material may include at least one selected from silicon, a blend of silicon and carbon, a composite of silicon and carbon, and a silicon alloy.

The silicon may include a silicon particle, a silicon nanowire, a silicon nanorod, a silicon nanotube, a silicon nanoribbon, or a combination thereof.

The silicon particle may have, for example, an average particle diameter in a range of about 0.1 nanometers (nm) to about 1 micrometer (μm). The silicon particle may have, for example, an average particle diameter in a range of about 0.1 nm to about 700 nm, about 0.1 nm to about 500 nm, about 1 nm to about 500 nm, or about 10 nm to about 300 nm.

The average particle diameter refers to "D50", which is a value of the particle diameter at 50% in a cumulative distribution curve in which the particles are cumulatively distributed from the smallest to the largest particles based on 100% of the total number of particles. The D50 may be measured by methods widely known in the art, and for example, may be measured by using a particle size analyzer or through an image obtained using a transmission electron microscope (TEM) or a scanning electron microscope (SEM). As another example, the D50 may be measured by using a dynamic light-scattering device, and then, performing data analysis to count the number of particles in each size range, so as to calculate the average particle diameter.

The silicon nanowire may have, for example, an average wire diameter in a range of about 1 nm to about 200 nm, about 10 nm to about 100 nm, or about 20 nm to about 70 nm. An aspect ratio of an average length of the silicon nanowire to the average wire diameter of the silicon nanowire may be, for example, in a range of about 10,000:1 to about 1:1, from about 5,000:1 to about 10:1, or about 1000:1 to about 100:1.

The silicon nanorod may have a similar average rod diameter to the average wire diameter of the silicon nanowire, and may have a smaller aspect ratio than that of the silicon nanowire. The silicon nanotube may have an average tube diameter in a range of about 10 nm to about 2000 nm, or about 100 nm to about 1000 nm, or about 300 nm to about 700 nm. The silicon nanotube may have an average tube diameter of about 500 nm. The silicon nanoribbon may have a width in a range of about 10 nm to about 1000 nm, or about 50 nm to about 500 nm, or about 50 nm to about 200 nm. The silicon nanoribbon may have a width of about 100 nm. The silicon nanoribbon may have an aspect ratio in a range of about 5 to about 500, or about 10 to about 200, or about 10 to about 100.

Carbon in the blend of silicon and carbon may include natural graphite, artificial graphite, or a combination thereof. Carbon in the blend of silicon and carbon may or may not include a pore. Carbon in the blend of silicon and carbon may include primary particles or secondary particles formed by aggregating the primary particles.

The composite of silicon and carbon may include a composite of silicon and a carbon nanotube or a composite of silicon and a carbon nanofiber. The composite of silicon and carbon may include a coating layer in which a carbon nanotube or a carbon nanofiber is coated on a surface of silicon. A thickness of the coating layer coated with a carbon nanotube or a carbon nanofiber may be in a nano-scale range, but is not limited thereto.

In the composite of silicon and a carbon nanotube, the carbon nanotube may be a single-walled carbon nanotube, a double-walled carbon nanotube, or a multi-walled carbon nanotube. The carbon nanotube may have an average tube diameter of about 80 nm or less, for example, about 60 nm or less. The carbon nanotube may have an aspect ratio of at least about 10.

In the composite of silicon and a carbon nanofiber, the carbon nanofiber may be in a fiber form of a carbon nanowire. The carbon nanowire may have an average wire diameter in a range of about 10 nm to about 500 nm, or about 20 nm to about 400 nm, or about 50 nm to about 200 nm. An aspect ratio of an average length of the silicon nanowire to the average wire diameter of the silicon nanowire may be, for example, a maximum of about 2000:1 or about 1000:1, or in a range from about 200:1 to about 2000:1, or from about 500:1 to about 1500:1, or from about 800:1 to about 1200:1.

When the average wire diameter and the aspect ratio of the carbon nanotube and the carbon nanofiber are within the ranges above, the composite negative active material including the carbon nanotube and the carbon nanofiber may have an excellent mechanical strength, thereby improving electrical conductivity.

The silicon alloy may be a Si—Y' alloy. Here, Y' may include calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), or a combination thereof.

An amount of the coating layer may be about 5 parts by weight or less based on 100 parts by weight of the total weights of the composite negative active material. For example, the amount of the coating layer may be about 4 parts by weight or less based on 100 parts by weight of the total weight of the composite negative active material. For example, the amount of the coating layer may be in a range of about 0.01 part by weight to about 4 parts by weight, or about 0.1 part by weight to about 4 parts by weight, or about 1 part per weight to about 3 parts by weight, based on 100 parts by weight of the total weight of the composite negative active material.

The coating layer may include a single layer or multiple layers. For example, the coating layer may include a single layer.

An amount of the water-soluble polymer may be about 5 parts by weight or less based on 100 parts by weight of the total weight of the composite negative active material. For example, the amount of the water-soluble polymer may be about 4 parts by weight or less based on 100 parts by weight of the total weight of the composite negative active material. For example, the amount of the water-soluble polymer may be about 3 parts by weight or less based on 100 parts by weight of the total weight of the composite negative active material. For example, the amount of the water-soluble polymer may be in a range of about 0.01 part by weight to about 5 parts by weight, or about 0.01 part by weight to about 3 parts by weight, or about 0.01 part by weight to about 2 parts by weight, or about 0.1 part by weight to about 1 part by weight, based on 100 parts by weight of the total weight of the composite negative active material.

An amount of the anionic component may be about 5 parts by weight or less based on 100 parts by weight of the total weight of the composite negative active material. For example, the amount of the anionic component may be about 4 parts by weight or less based on 100 parts by weight of the total weight of the composite negative active material. For example, the amount of the anionic component may be about 3 parts by weight or less based on 100 parts by weight of the total weight of the composite negative active material. For example, the amount of the anionic component may be in a range of about 0.01 part by weight to about 5 parts by weight, or about 0.01 part by weight to about 3 parts by weight, or about 0.01 part by weight to about 2 parts by weight, or about 0.1 part by weight to about 1 part by weight, based on 100 parts by weight of the total weight of the composite negative active material.

A molar ratio of the water-soluble polymer to the anionic component may be in a range of about 1:0.2 to about 1:3. For example, the molar ratio of the water-soluble polymer to the anionic component may be in a range of about 1:0.5 to about 1:3 or about 1:0.8 to about 1:2 or about 1:1 to about 1:2.

When the amount of the water-soluble polymer, the amount of the anionic component, and the molar ratio of the water-soluble polymer to the anionic component are within the ranges above, the composite negative active material including the coating layer that includes the water-soluble polymer and the anionic component may have a high tensile strength and good flexibility in spite of a significant volume change of the core including the silicon-based material, and accordingly, the composite negative active material including the coating layer may maintain its stability in a good manner and the transfer of lithium ions may be facilitated. Thus, the composite negative active material may have improved electrochemical characteristics (e.g., lifespan characteristics).

The composite negative active material may further include an inorganic material which is non-reactive with the core including the silicon-based material.

The inorganic material may have an average particle diameter of at least about 1 μm. When the inorganic material has a nano-sized average particle diameter of less than about 1 μm, the inorganic material may be reactive with the core including the silicon-based material, which is not preferable.

The average particle diameter refers to "D50" as described above, and may be measured according to the method described above, and thus a detailed description of the measuring method will be omitted.

The inorganic material may include at least one selected from $MgF_2$, $Mg_3(PO_4)_2$, $AlF_3$, $Al(PO_4)_3$, $Al_2O_3$, and $MgO$. For example, the inorganic material may include $AlF_3$, $Al(PO_4)_3$, $Al_2O_3$, or a combination thereof.

The inorganic material may minimize formation of an SEI layer during a charging and discharging process of a lithium secondary battery, thereby improving charge and discharge characteristics including lifespan characteristics.

An amount of the inorganic material may be about 5 parts by weight or less based on 100 parts by weight of the total weight of the composite negative active material. For example, the amount of the inorganic material may be about 4 parts by weight or less based on 100 parts by weight of the total weight of the composite negative active material. For example, the amount of the inorganic material may be about 3 parts by weight based on 100 parts by weight of the total weight of the composite negative active material. For example, the amount of the inorganic material may be in a range of about 0.01 part by weight to about 5 parts by weight, or about 0.01 part by weight to about 3 parts by weight, or about 0.01 part to about 2 parts by weight, or about 0.1 part by weight to about 1 part by weight, of the total weight of the composite negative active material.

When the amount of the inorganic material included in the coating layer is greater than 5 parts by weight based on 100 parts by weight of the total weight of the composite negative active material, the coating layer may serve as a low-resistant layer that may degrade battery performance. When the amount of the inorganic material included in the coating layer is less than 0.01 part by weight based on 100 parts by weight of the total weight of the composite negative active material, the coating layer may exhibit incomplete effects.

A negative electrode according to another aspect of the present inventive concept may include the above-described composite negative active material.

The negative electrode may further include a binder. Examples of the binder include a vinylidene fluoride/hexafluoropropylene copolymer, polyvinylidene fluoride, polyacrylonitrile, polymethyl methacrylate, polytetrafluoroethylene (PTFE), a mixture of the above-described polymers, or a styrene-butadiene rubber-based polymer. Examples of a solvent include N-methylpyrrolidone (NMP), acetone, or water. But the binder and the solvent are not limited thereto. Any suitable binder and solvent used in the art may be used.

In addition, the negative electrode may further include, if desired, a conductive material. Examples of the conductive material include carbon fiber or carbon nanotube such as carbon black, graphite granules, natural graphite, artificial graphite, acetylene black, or Ketjen black; metal powder, metal fiber, or metal tube such as copper, nickel, aluminum, or silver; and a conductive polymer such as a polyphenylene derivative, but are not limited thereto. Any suitable conductive material used in the art may be used.

A lithium secondary battery according to another aspect of the present inventive concept may include the above-described negative electrode.

The lithium secondary battery may include: a negative electrode including the above-described composite negative active material; a positive electrode facing the negative electrode; and an electrolyte material disposed between the negative electrode and the positive electrode.

The positive electrode may be prepared as follows: a positive active material, a conductive material, a binder, and a solvent may be mixed together to prepare a composition for forming a positive electrode slurry. The positive electrode slurry may be directly coated on a positive current collector, and dried, thereby preparing a positive electrode on which a positive active material layer is formed. Alternatively, a positive electrode, on which a positive active material layer is formed, may be prepared by casting the positive electrode slurry on a separate support to form a positive active material film, which may then be separated from the support and laminated on a positive current collector.

As the positive active material, any lithium-containing metallic oxide commercially used in the art may be used without limitation. For example, the positive active material may include at least one composite oxide of lithium and a metal selected from cobalt (Co), manganese (Mn), nickel (Ni), and a combination thereof. For example, the positive active material may include a compound represented by one of formulae such as $Li_aA_{1-b}B'_bD'_2$ (where $0.90 \leq a \leq 1$ and $0 \leq b \leq 0.5$); $Li_aE_{1-b}B'_bO_{2-c}D'_c$ (where $0.90 \leq a \leq 1$, $0 \leq b \leq 0.5$, and $0 \leq c \leq 0.05$); $LiE_{2-b}B'_bO_{4-c}D'_c$ (where $0 \leq b \leq 0.5$ and $0 \leq c \leq 0.05$); $Li_aNi_{1-b-c}Co_bB'_cD'_\alpha$ (where $0.90 \leq a \leq 1$, $0 \leq b \leq 0.5$, $0 < c \leq 0.05$, and $0 < \alpha \leq 2$); $Li_aNi_{1-b-c}Co_bB'_cO_{2-\alpha}F'_\alpha$ (where $0.90 \leq a \leq 1$, $0 \leq b \leq 0.5$, $0 < c < 0.05$, and $0 < \alpha < 2$); $Li_aNi_{1-b-c}Co_bB'_cO_{2-\alpha}F'_\alpha$ (where $0.90 \leq a \leq 1$, $0 \leq b \leq 0.5$, $0 < c < 0.05$, and $0 < \alpha < 2$); $Li_aNi_{1-b-c}Mn_bB'_cD'_\alpha$ (where $0.90 \leq a \leq 1$, $0 \leq b \leq 0.5$, $0 \leq c \leq 0.05$, and $0 < \alpha \leq 2$); $Li_aNi_{1-b-c}Mn_bB'_cO_{2-\alpha}F'_2$ (where $0.90 \leq a \leq 1$, $0 \leq b \leq 0.5$, $0 \leq c \leq 0.05$, and $0 < \alpha < 2$); $Li_aNi_{1-b-c}Mn_bB'_cO_{2-\alpha}F'_2$ (where $0.90 \leq a \leq 1$, $0 \leq b \leq 0.5$, $0 \leq c \leq 0.05$, and $0 < \alpha < 2$); $Li_aNi_bE_cG_dO_2$ (where $0.90 \leq a \leq 1$, $0 \leq b \leq 0.9$, $0 \leq c \leq 0.5$, and $0.001 \leq d \leq 0.1$); $Li_aNi_bCo_cMn_dG_eO_2$ (where $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1$ and $0.001 \leq b \leq 0.1$); $Li_aCoG_bO_2$ (where $0.90 \leq a \leq 1$ and $0.001 \leq b \leq 0.1$); $Li_aMnG_bO_2$ (where $0.90 \leq a \leq 1$ and $0.001 \leq b \leq 0.1$); $Li_aMn_2G_bO_4$ (where $0.90 \leq a \leq 1$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$.

In formulae above, A may include nickel (Ni), cobalt (Co), manganese (Mn), or a combination thereof; B' may include aluminum (Al), nickel (Ni), cobalt (Co), manganese (Mn), chromium (Cr), iron (Fe), magnesium (Mg), strontium (Sr), vanadium (V), a rare earth element, or a combination thereof; D' may include oxygen (O), fluorine (F), sulfur (S), phosphorus (P), or a combination thereof; E may include cobalt (Co), manganese (Mn), or a combination thereof; F' may include fluorine (F), sulfur (S), phosphorus (P), or a combination thereof; G may include aluminum (Al), chromium (Cr), manganese (Mn), iron (Fe), magnesium (Mg), lanthanum (La), cerium (Ce), Sr, V, or a combination thereof; Q may include titanium (Ti), molybdenum (Mo), manganese (Mn), or a combination thereof; I' may include chromium (Cr), vanadium (V), iron (Fe), scandium (Sc), yttrium (Y), or a combination thereof; and J may include vanadium (V), chromium (Cr), manganese (Mn), cobalt (Co), nickel (Ni), copper (Cu), or a combination thereof.

For example, the compound may have a coating layer on a surface thereof, or the compound and a compound having a coating layer on a surface thereof may be used as a mixture. The coating layer may include a compound of a coating element, such as an oxide of a coating element, a hydroxide of a coating element, an oxyhydroxide of a coating element, an oxycarbonate of a coating element, or a hydroxyl carbonate of a coating element. The compound forming the coating layer may be amorphous or crystalline. The coating element included in the coating layer may include magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a combination thereof. A formation process (e.g., spray coating or dip-coating) of the coating layer may be any coating method that does not adversely affect physical properties of the positive material by using the elements above, and the coating method may be well understood by those of ordinary skill in the art. Thus, the description of the coating method will be omitted in the present specification.

Examples of the conductive material include carbon fiber or carbon nanotubes, such as carbon black, graphite particles, natural graphite, artificial graphite, acetylene black, or Ketjen black; metal powder, metal fiber, or metal tube, such as copper (Cu), nickel (Ni), aluminum (Al), or silver (Ag); and an electrically conductive polymer, such as a polyphenylene derivative, but are not limited thereto. Any material suitable as a conductive material in the art may be used.

Examples of the binder include a polyvinylidene fluoride/hexafluoropropylene copolymer, polyvinylidene fluoride, polyacrylonitrile, polymethyl methacrylate, PTFE, a mixture of the above-described polymers, and a styrene-butadiene rubber-based polymer. Examples of the solvent include N-methylpyrrolidone (NMP), acetone, and water, but are not limited thereto. Any suitable binder and solvent used in the art may be used.

Alternatively, a plasticizer may be further added to the positive electrode slurry to thereby form apertures inside the positive electrode plate.

Amounts of the positive active material, the conductive agent, the binder, and the solvent are similar to those commercially used in the art of lithium secondary batteries. Depending on the use and constitution of the lithium battery, at least one of the conductive agent, the binder, and the solvent may be omitted.

The positive current collector may be generally prepared to have a thickness in a range of about 3 μm to about 50 μm. The positive current collector may be made of any material available in the art without particular limitation, the material causing no chemical change in batteries, but having electrical conductivity. For example, the positive current collector may be made of copper, stainless steel, aluminum, nickel, titanium, sintered carbon, copper or stainless steel surface treated with carbon, nickel, titanium, or silver, or an aluminum-cadmium alloy. In addition, fine uneven structures may be formed on a surface of the positive current collector to enhance a binding strength of the positive current collector to the positive active material. The positive current collector may be used in various forms, such as film, sheet, foil, net, porous body, foaming body, and non-woven fabric.

The positive electrode may have a mixing density of at least 2.0 grams/cubic centimeter (g/cc). The positive electrode may have a mixing density from about 1.5 g/cc to about 20 g/cc, or about 2.0 g/cc to about 20 g/cc, or about 3.0 g/cc to about 10 g/cc.

Meanwhile, the negative electrode may be prepared as follows. The negative electrode may be prepared in the same manner as in the preparation of the positive electrode, except that a negative active material is used instead of the positive active material. In addition, when preparing for forming a negative electrode slurry, the electrically conductive agent, the binder, and the solvent may be the same as those defined in connection with the preparation of the positive electrode.

For example, the negative active material, the binder, and the solvent may be mixed together to prepare a negative electrode slurry. Here, the conductive agent may be optionally mixed therewith. The negative electrode slurry may be directly coated on a negative current collector, thereby preparing a negative electrode. Alternatively, a negative electrode may be prepared by casting the negative electrode slurry on a separate support to form a negative active material film, which may then be separated from the support and laminated on a negative current collector.

As the negative active material, the above-described electrode active material may be used. In addition, the negative active material may include, in addition to the above-described electrode active material, any material suitable as the negative active material used in the art of lithium secondary batteries. For example, the negative active material may include at least one selected from the group consisting of a lithium metal, a metal alloyable with lithium, a transition metal oxide, a non-transition metal oxide, and a carbonaceous material.

For example, the metal alloyable with lithium may be tin (Sn), aluminum (Al), germanium (Ge), lead (Pb), bismuth (Bi), antimony (Sb), a Sn—$Y_1$ alloy (where $Y_1$ is an alkali metal, an alkali earth metal, a Group 13 element, a Group 14 element, a transition metal, a rare earth element, or a combination thereof, and is not Sn). The element $Y_1$ may include magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), or a combination thereof.

For example, the transition metal oxide may include a lithium titanate oxide, a vanadium oxide, or a lithium vanadium oxide.

For example, the non-transition metal oxide may include $SnO_2$ or $SiO_x$ (where $0<x<2$).

The carbonaceous material may include crystalline carbon, amorphous carbon, or a combination thereof. Examples of the crystalline carbon include natural graphite or artificial graphite that is in shapeless, plate, flake, spherical, or fibrous form. Examples of the amorphous carbon include soft carbon (e.g., carbon sintered at low temperatures), hard carbon, meso-phase pitch carbides, or sintered cokes, and the like.

Amounts of the negative active material, the conductive agent, the binder, and the solvent are similar to those generally used in the art of lithium secondary batteries.

The negative current collector may be generally prepared to have a thickness in a range of about 3 μm to about 500 μm. The negative current collector may be made of any material available in the art without particular limitation, the material causing no chemical change in batteries, but having electrical conductivity. For example, the negative current collector may be made of copper, stainless steel, aluminum, nickel, titanium, sintered carbon, copper or stainless steel surface treated with carbon, nickel, titanium, or silver, or an aluminum-cadmium alloy. In addition, fine uneven structures may be formed on a surface of the negative current collector to enhance a binding strength of the negative current collector to the negative active material. The negative current collector may be used in various forms, such as film, sheet, foil, net, porous body, foaming body, and non-woven fabric.

Then, a separator to be disposed between the positive electrode and the negative electrode is prepared. The separator used herein may be any suitable separator used in the art of lithium batteries. In particular, a separator with low resistance against ionic movement of electrolytes and an excellent electrolyte-containing capacity may be used. For example, the separator may be selected from glass fiber, polyester, polyethylene, polypropylene, PTFE, or a combination thereof, and may be in the form of a woven or a non-woven fabric. The separator used herein may have a pore diameter in a range of about 0.01 μm to about 10 μm, and a thickness in a range of about 5 μm to about 300 μm.

A non-aqueous electrolyte material containing a lithium salt includes a non-aqueous electrolyte composition and lithium, and the non-aqueous electrolyte composition may include a non-aqueous electrolyte, an organic solid electrolyte, or an inorganic solid electrolyte.

The non-aqueous electrolyte may include, for example, an aprotic organic solvent, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydrofuran, 2-methyl tetrahydrofuran, dimethyl sulfoxide, 1,3-dioxolane, formamide, dimethylformamide, dioxolane, acetonitrile, nitromethane, methyl formate, methyl acetate, phosphoric acid trimesters, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, or ethyl propionate.

The organic solid electrolyte may include, for example, a polyethylene derivative, a polyethylene oxide derivative, a polypropylene oxide derivative, a phosphoric acid ester polymer, a poly agitation lysine, a polyester sulfide, a polyvinyl alcohol, a polyvinylidene fluoride, or a polymer including an ionic dissociable group.

The inorganic solid electrolyte may include, for example, nitride, halide, or sulfate of lithium (Li), such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt may include any lithium salt commercially used in the art of lithium secondary batteries, and examples of the lithium salt that is easily dissolved in the non-aqueous electrolyte include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lithium salts of low aliphatic carboxylicic acids, 4-phenyl boronic acid lithium salt, or lithium imide.

Lithium secondary batteries may be categorized as lithium ion secondary batteries, lithium ion polymer secondary batteries, and lithium polymer secondary batteries, depending on the separator and the electrolyte types used. Lithium secondary batteries may also be categorized as cylindrical batteries, rectangular-shaped batteries, coin-shaped batteries, or pouch-shaped batteries, depending on the shape thereof. Lithium secondary batteries may also be categorized as bulk-type batteries or thin film-type batteries, depending on the size thereof.

Methods of manufacturing lithium secondary batteries are widely known in the art, and thus the description of the methods will be omitted in the present specification.

Figure 3:
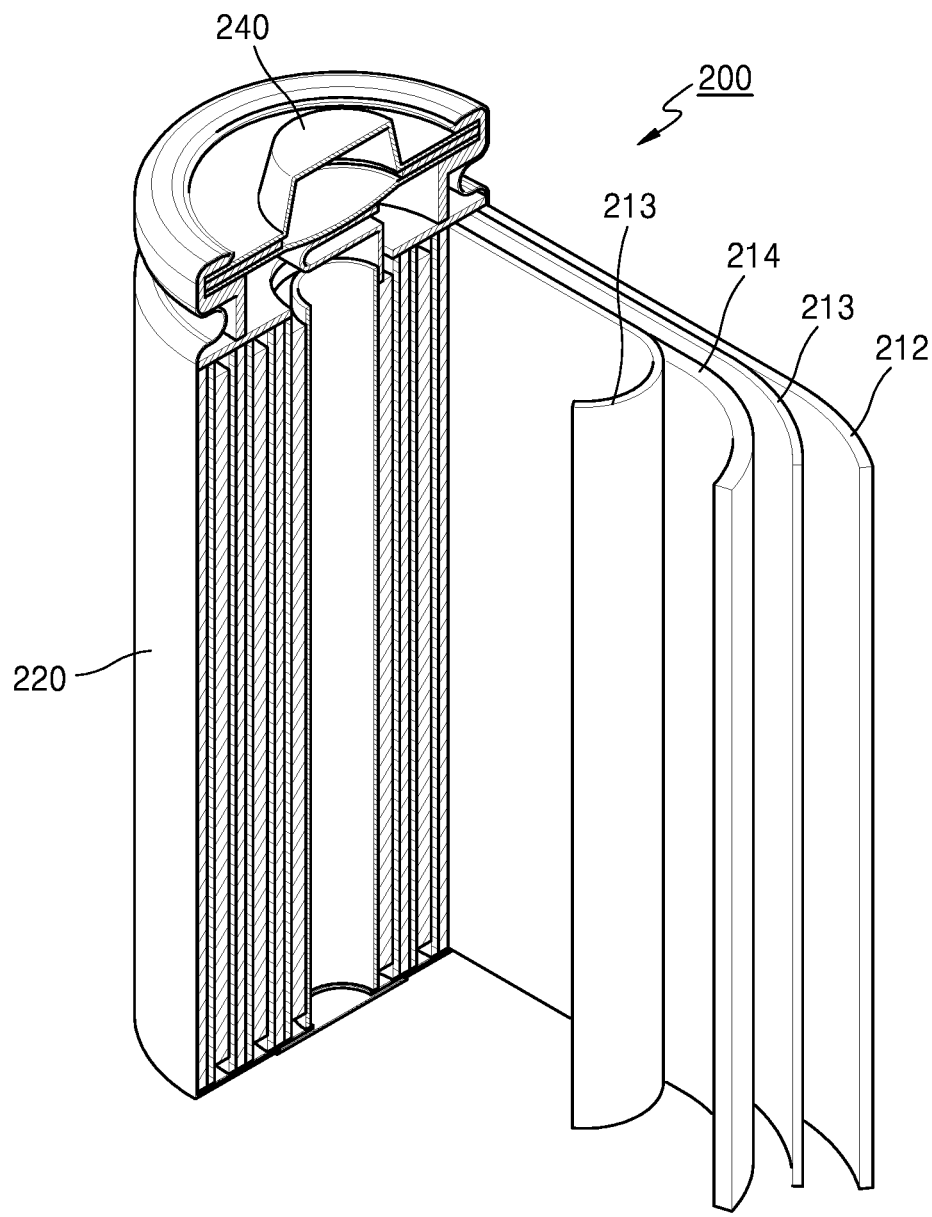
FIG. 3 is a diagram schematically illustrating a structure of a lithium secondary battery according to an exemplary embodiment.

FIG. 3 is a schematic diagram of a structure of a lithium secondary battery 200 according to an exemplary embodiment.

As shown in FIG. 3, the lithium secondary battery 200 includes a positive electrode 214, one or more separators 213, and a negative electrode 212. The positive electrode 214, the separators 213, and the negative electrode 212 are wound or folded and accommodated in a battery case 220. Then, an organic electrolyte is introduced into the battery case 220, and sealed with a sealing element 240, thereby completing a manufacture of the lithium battery 200. The battery case 220 may be cylindrical, rectangular-shaped, or thin film-shaped. The lithium secondary battery 200 may be a lithium ion secondary battery. The lithium secondary battery 200 may be prepared as a thin film-type battery to be used as a power source for portable devices, such as a mobile phone, a personal digital assistant (PDA), or a portable multimedia player (PMP), a power source for motor devices, such as electrically-driven tools, hybrid vehicles requiring high output power, or electrical vehicles, or a power source for display devices, such as electronic ink (e-ink), electronic paper (e-paper), a flexible liquid crystal display (LCD) or a flexible organic light-emitting diode, and to be used as a micro-battery to supply a power source for an integrated circuit device on a printed circuit board (PCB).

Meanwhile, a separator 213 may be disposed between the positive electrode 214 and the negative electrode 212, thereby forming an electrode assembly. Once the electrode assembly is laminated in a bicell structure, an organic electrolyte may be impregnated thereinto, and the resulting product is put into a pouch and sealed, thereby completing the manufacture of a lithium ion polymer secondary battery.

Furthermore, a plurality of electrode assemblies may be laminated to form a battery pack, and thus the formed battery pack may be used in all devices requiring high capacity and high power.

A method of preparing the composite negative active material, according to another aspect of the present inventive concept, includes: contacting a core including a silicon material and a first solution containing a water-soluble polymer to obtain a first suspension including an intermediate product; and contacting a second solution containing at least one anionic component selected from $F^-$, $PO_4^{3-}$, $PF_6^-$, $BO_3^{3-}$, and $BF_4^-$ and the suspension including the intermediate product to chemically bond the water-soluble polymer to the at least one anionic component to provide a second suspension; and drying the second suspension to prepare the composite negative active material, wherein the composite negative active material includes the core including the silicon material and a coating layer disposed on the core.

First, the core including the silicon-based material is added and stirred to the solution containing a water-soluble polymer to obtain an intermediate product.

The core including the silicon-based material may include at least one selected from silicon, a blend of silicon and carbon, a composite of silicon and carbon, and a silicon alloy. For example, the core including the silicon-based material may include a composite of silicon and carbon.

The composite of silicon and carbon may include a mechanically milled composite of silicon and carbon. Here, a device used for a mechanical milling process may be a ball mill, a planetary ball mill, a high-energy ball mill, a Nobilta mill, or Mechano Fusion (e.g., Hosokawha/NOB-130 or Hosokawha/AMS), but is not limited thereto. Any suitable device used for a mechanical milling process in the art may be used. The composite of silicon and carbon may be prepared by appropriately controlling the number of rotations of a device used for a mechanical milling process, amounts of silicon and carbon to be introduced, and a size of a reactor.

The solution containing the water-soluble polymer may include a polyvinyl alcohol homopolymer or a polyvinyl alcohol copolymer. For example, the solution containing the water-soluble polymer may be an aqueous solution in which a polyvinyl alcohol homopolymer or a polyvinyl alcohol copolymer is dissolved.

Next, a solution containing at least one anionic component selected from $F^-$, $PO_4^{3-}$, $PF_6^-$, $BO_3^{3-}$, and $BF_4^-$ was added to the intermediate product to form a mixed solution, followed by drying the mixed solution, thereby forming a composite negative active material including: a core including the silicon-based material; and a coating layer disposed on the core, the coating layer including a water-insoluble polymer composite in which at least one anionic component selected from $F^-$, $PO_4^{3-}$, $PF_6^-$, $BO_3^{3-}$, and $BF_4^-$ is chemically bonded to a water-soluble polymer.

The solution containing the anionic component may include at least one selected from $NH_4F$, $NH_2H_2PO_4$, $NH_4PF_6$, $(NH_4)_3BO_3$, $NH_4BF_4$, and $H_3BO_3$. For example, the solution containing the anionic component may include $NH_4F$, $NH_2H_2PO_4$, or a combination thereof.

A molar ratio of solid content of the water-soluble polymer in the solution containing the water-soluble polymer to solid content of the anionic component in the solution containing the anionic component may be in a range of about 1:0.2 to about 1:3, or, for example, in a range of about 1:0.5 to about 1:3 or about 1:0.8 to about 1:2.5 or about 1:1 to about 1:2.

The term "solid content" as used herein refers to a solid material of the water-soluble polymer or a solid material of the anionic component that remains after the solvent evaporates from the solution containing the water-soluble polymer or the solution containing the anionic component.

The drying of the mixed solution may include performing a heat treatment at a temperature of about 400° C. or less. For example, the drying of the mixed solution may include performing a heat treatment at a temperature in a range of about 100° C. to about 400° C. The heat treatment may be performed for about 1 hour to about 12 hours, but such conditions may be appropriately changed. The heat treatment may be performed in the air or in an oxidizing atmosphere. The coating layer included in the composite negative active material finally obtained following the heat treatment may be uncarbonized. In addition, the coating layer may be water-insoluble. Then, the obtained composite negative active material may be dried in a furnace.

The method of preparing the composite negative active material may further include adding an inorganic material that is not reactive with the core including the silicon material.

The inorganic material may include at least one selected from $MgF_2$, $Mg_3(PO_4)_2$, $AlF_3$, $Al(PO_4)_3$, and $Al_2O_3$. For example, the inorganic material may include $AlF_3$, $Al(PO_4)_3$, $Al_2O_3$, or a combination thereof.

The inorganic material may minimize formation of an SEI layer during a charging and discharging process of a lithium secondary battery, thereby improving charge and discharge characteristics, such as lifespan characteristics.

An amount of the inorganic material may be about 5 parts by weight or less based on 100 parts by weight of the total weight of the composite negative active material. For example, the amount of the inorganic material may be about 4 parts by weight or less based on 100 parts by weight of the total weight of the composite negative active material. For example, the amount of the inorganic material may be about 3 parts by weight based on 100 parts by weight of the total weight of the composite negative active material. For example, the amount of the inorganic material may be in a range of about 0.01 part by weight to about 5 parts by weight, or about 0.01 part by weight to about 3 parts by weight, or about 0.01 part to about 2 parts by weight, or about 0.1 part by weight to about 1 part by weight of the total weight of the composite negative active material.

When the amount of the inorganic material included in the coating layer is greater than 5 parts by weight based on 100 parts by weight of the total weight of the composite negative active material, the coating layer may serve as a low-resistant layer that may degrade battery performance. When the amount of the inorganic material included in the coating layer is less than 0.01 part by weight based on 100 parts by weight of the total weight of the composite negative active material, the coating layer may exhibit incomplete effects.

Hereinafter, the present inventive concept will be described in further detail with reference to the following examples. However, these examples are for illustrative purposes only and are not intended to limit the scope of the present inventive concept.

EXAMPLES

Example 1

Preparation of a Composite Negative Active Material

Silicon powders (having an average particle diameter of about 0.5 μm) and a carbon nanotube (available from CNT Co. Ltd, and having an average tube diameter of about 30 nm and an average tube length in a range of about 1 μm to about 25 μm) were mixed at a weight ratio of about 7:3 to obtain a mixture. The obtained mixture was placed in a glow box including a ball container, and then, in an argon gas atmosphere, was subjected to a planetary ball mill (available from FRITSCH) process, and followed by mixing and milling at a speed of about 400 rpm for about 2 hours, so as to obtain a composite of silicon and carbon, the composite including a coating layer in which a carbon nanotube was coated on a surface of the silicon powder.

10 g of powders of the composite of silicon and carbon was added to 0.2 g of a solution in which 5 weight % of polyvinyl alcohol (having a weight average molecular weight in a range of about 9,000 Da to about 10,000 Da) was dissolved, and then, was mixed together, so as to obtain an intermediate product-containing solution. Then, $NH_4F$ was added to the intermediate product-containing solution so that a molar ratio of polyvinyl alcohol:$F^-$ ions was about 1:0.5. A heat treatment was performed thereon at a temperature of about 100° C. to remove moisture therefrom, so as to prepare a composite negative active material including a coating layer, the coating layer including a water-insoluble polymer composite in which ionic components (i.e., $F^-$ ions) were chemically bonded to polyvinyl alcohol in the powders of the composite of silicon and carbon.

Example 2

Preparation of a Composite Negative Active Material $NH_4F$ was added to the intermediate product-containing solution so that a molar ratio of polyvinyl alcohol:$F^-$ ions was about 1:1, instead of about 1:0.5. Then, a heat treatment was performed thereon at a temperature of about 100° C. to remove moisture therefrom, so as to prepare a composite negative active material including a coating layer, the coating layer including a water-insoluble polymer composite in which ionic components (i.e., $F^-$ ions) were chemically bonded to polyvinyl alcohol in the powders of the composite of silicon and carbon.

Example 3

Preparation of a Composite Negative Active Material $(NH_4)_3PO_4$ was Added to the Intermediate Product-Containing Solution so that a molar ratio of polyvinyl alcohol: $PO_4^{3-}$ ions was about 1:0.7, instead of adding $NH_4F$ to the intermediate product-containing solution in which polyvinyl alcohol and $F^-$ ions were included at a molar ratio of about 1:0.5. Then, a heat treatment was performed thereon at a temperature of about 100° C. to remove moisture therefrom, so as to prepare a composite negative active material including a coating layer, the coating layer including a water-insoluble polymer composite in which ionic components (i.e., $PO_4^{3-}$ ions) were chemically bonded to polyvinyl alcohol in the powders of the composite of silicon and carbon.

Example 4

Preparation of a Composite Negative Active Material $(NH_4)_3PO_4$ was added to the intermediate product-containing solution so that a molar ratio of polyvinyl alcohol: $PO_4^{3-}$ ions was about 1:1, instead of adding $NH_4F$ to the intermediate product-containing solution in which polyvinyl alcohol and $F^-$ ions were included at a molar ratio of about t 1:0.5. Then, a heat treatment was performed thereon at a temperature of about 100° C. to remove moisture therefrom, so as to prepare a composite negative active material including a coating layer, the coating layer including a water-insoluble polymer composite in which ionic components (i.e., $PO_4^{3-}$ ions) were chemically bonded to polyvinyl alcohol in the powders of the composite of silicon and carbon.

Example 5

Preparation of a Composite Negative Active Material $(NH_4)_3PO_4$ was added to the intermediate product-containing solution so that a molar ratio of polyvinyl alcohol: $PO_4^{3-}$ ions was about 1:1.3, instead of instead of adding $NH_4F$ to the intermediate product-containing solution in which polyvinyl alcohol and $F^-$ ions were included at a molar ratio of about 1:0.5. Then, a heat treatment was performed at a temperature of about 100° C. to remove moisture therefrom, so as to prepare a composite negative active material including a coating layer, the coating layer including a water-insoluble polymer composite in which ionic components (i.e., $PO_4^{3-}$ ions) were chemically bonded to polyvinyl alcohol in the powders of the composite of silicon and carbon.

Example 6

Preparation of a Composite Negative Active Material $NH_4F$ and $(NH_4)_3PO_4$ were added to the intermediate product-containing solution so that a molar ratio of polyvinyl alcohol:$F^-$ ions:$PO_4^{3-}$ ions was about 1:0.1:0.7, instead of adding $NH_4F$ to the intermediate product-containing solution in which polyvinyl alcohol and $F^-$ ions were included at a molar ratio of about 1:0.5. Then, a heat treatment was performed thereon at a temperature of about 100° C. to remove moisture therefrom, so as to prepare a composite negative active material including a coating layer, the coating layer including a water-insoluble polymer composite in which ionic components, such as $F^-$ ions and $PO_4^{3-}$ ions, were chemically bonded to polyvinyl alcohol in the powders of the composite of silicon and carbon.

Example 7

Preparation of a Composite Negative Active Material $NH_4F$ and $(NH_4)_3PO_4$ were added to the intermediate product-containing solution so that a molar ratio of polyvinyl alcohol:$F^-$ ions:$PO_4^{3-}$ ions was about 1:0.2:0.7 instead of adding $NH_4F$ to the intermediate product-containing solution in which polyvinyl alcohol and $F^-$ ions were included at a molar ratio of about 1:0.5. Then, a heat treatment was performed thereon at a temperature of about 100° C. to remove moisture therefrom, so as to prepare a composite negative active material including a coating layer, the coating layer including a water-insoluble polymer composite in which ionic components, such as $F^-$ ions and $PO_4^{3-}$ ions, were chemically bonded to polyvinyl alcohol in the powders of the composite of silicon and carbon.

Example 8

Preparation of a Composite Negative Active Material $(NH_4)_3PO_4$ and $AlNO_3$ were added to the intermediate product-containing solution so that a molar ratio of polyvinyl alcohol:$F^-$ ions: $PO_4^{3-}$ ions: $Al^{3+}$ ions was about 1:0.1:1.4:0.1, instead of adding $NH_4F$ to the intermediate product-containing solution in which polyvinyl alcohol and $F^-$ ions were included at a molar ratio of about 1:0.5. Then, a heat treatment was performed thereon at a temperature of about 100° C. to remove moisture therefrom, so as to prepare a composite negative active material including a coating layer, the coating layer including a water-insoluble polymer composite in which ionic components, such as $F^-$ ions, $PO_4^{3-}$ ions, and $Al^{3+}$ ions, were chemically bonded to polyvinyl alcohol in the powders of the composite of silicon and carbon.

Example 9

Preparation of a Composite Negative Active Material $(NH_4)_3PO_4$ and $Al(PO_4)_3$ were added to the intermediate product-containing solution so that a molar ratio of polyvinyl alcohol:$F^-$ ions:$PO_4^{3-}$ ions: $Al(PO_4)_3$ was about 1:0.2:1.4:0.1, instead of adding $NH_4F$ to the intermediate product-containing solution in which polyvinyl alcohol and $F^-$ ions were included at a molar ratio of about 1:0.5. Then, a heat treatment was performed thereon at a temperature of about 100° C. to remove moisture therefrom, so as to prepare a composite negative active material including a coating layer, the coating layer including a water-insoluble polymer composite in which ionic components, such as $F^-$ ions, $PO_4^{3-}$ ion, and $Al^{3+}$ ions, were chemically bonded to polyvinyl alcohol in the powders of the composite of silicon and carbon.

Comparative Example 1

Preparation of a Composite Negative Active Material

Silicon powders (having an average particle diameter of about 0.5 μm) and a carbon nanotube (available from CNT Co. Ltd, and having an average tube diameter of about 30 nm and an average tube length in a range of about 1 μm to about 25 μm) were mixed at a weight ratio of about 7:3 to obtain a mixture. The obtained mixture was placed in a glow box including a ball container, and then, in an argon gas atmosphere, was subjected to a planetary ball mill (available from FRITSCH) process, and followed by mixing and milling at a speed of about 400 rpm for about 2 hours, so as to obtain powders of a composite of silicon and carbon, the composite including a coating layer in which a carbon nanotube was coated on a surface of the silicon powder.

Comparative Example 2

Preparation of a Composite Negative Active Material

Silicon powders (having an average particle diameter of about 0.5 μm) and a carbon nanotube (available from CNT Co. Ltd, and having an average tube diameter of about 30 nm and an average tube length in a range of about 1 μm to about 25 μm) were mixed at a weight ratio of about 7:3 to obtain a mixture. The obtained mixture was placed in a glow box including a ball container, and then, in an argon gas atmosphere, was subjected to a planetary ball mill (available from FRITSCH) process, and followed by mixing and milling at a speed of about 400 rpm for about 2 hours, so as to obtain powders of a composite of silicon and carbon, the composite including a coating layer in which a carbon nanotube was coated on a surface of the silicon powder.

10 g of powders of the composite of silicon and carbon was added to 0.2 g of a solution in which 5 weight % of polyvinyl alcohol (having a weight average molecular weight in a range of about 9,000 to about 10,000) was dissolved, and then, was mixed together. A heat treatment was performed thereon at a temperature of about 100° C. to remove moisture therefrom, so as to prepare a composite negative active material including a coating layer, the coating layer including polyvinyl alcohol in the powders of the composite of silicon and carbon.

Example 10

Preparation of a Lithium Secondary Battery (a Coin-Type Half Cell)

The composite negative active material powders of Example 1, an aqueous solution binder including polyacrylate substituted with lithium (LiPAA available by Sigma-Aldrich), and carbon black (e.g., Ketjen black) were mixed together at a weight ratio of about 89:10:1, thereby forming a negative active material slurry.

A copper foil having a thickness of 15 μm was coated with the negative active material slurry to a thickness in a range of about 50 μm to about 60 μm by using a doctor blade. The coated copper foil was dried at a temperature of about 80° C., and then, additionally vacuum-dried at a temperature of about 120□, thereby preparing a negative electrode plate. The negative electrode plate was roll-pressed, thereby preparing a sheet-shaped anode for a coin-type cell. Here, the negative electrode had a capacity in a range of about 3.0 $mAh/cm^2$ to about 3.5 $mAh/cm^2$.

The negative electrode was used to prepare a coin-type half cell (CR2032 type) with a diameter of about 12 mm.

When preparing the coin-type half cell (CR2032 type), lithium metal was used as a counter electrode, and a lithium salt, in which 1.3 M $LiPF_6$ was dissolved in a mixed solvent of ethylene carbonate (EC), diethyl carbonate (DEC), and fluoroethylene carbonate (FEC) (at volume ratio of 2:6:2), was used as an electrolyte.

Examples 11 to 18

Preparation of Lithium Secondary Batteries (Coin-Type Half Cells)

Coin-type half cells (CR2032 type) were each prepared in the same manner as Example 10, except that in preparation of a negative active material slurry, the composite negative active materials powders of Examples 2 to 9 were used instead of the composite negative active material powders of Example 1.

Comparative Examples 3 and 4

Preparation of Lithium Secondary Batteries (i.e., Coin-Type Cells)

Coin-type half cells (CR2032 type) were each prepared in the same manner as Example 10, except that in preparation of the composite negative active materials powders of Comparative Examples 1 and 2 were used instead of the composite negative active material powders of Example 1.

Analytical Example 1

Analysis of $^1$N NMR Spectrum and $^{19}$F NMR Spectrum—Confirmation of an Anionic Component in a Coating Layer on a Surface of a Composite Negative Active Material 10 mg of the composite negative active materials powders of Example 1 and Comparative Example 2 were each dissolved in 0.75 mL of $D_2O$, and then, each of the mixed solutions was subjected to a $^1$H NMR spectrum analysis and a $^{19}$F NMR spectrum analysis. The results are shown in FIGS. 4A to 4D.

A device used for the $^1$H NMR spectrum analysis was a Unity NOVA600 (at a spectrometer frequency of 600 MHz) available from Varian, and a device used for the $^{19}$F NMR spectrum analysis was also a Unity NOVA600 (at a spectrometer frequency of 600 MHz) available from Varian.

Figure 4A:
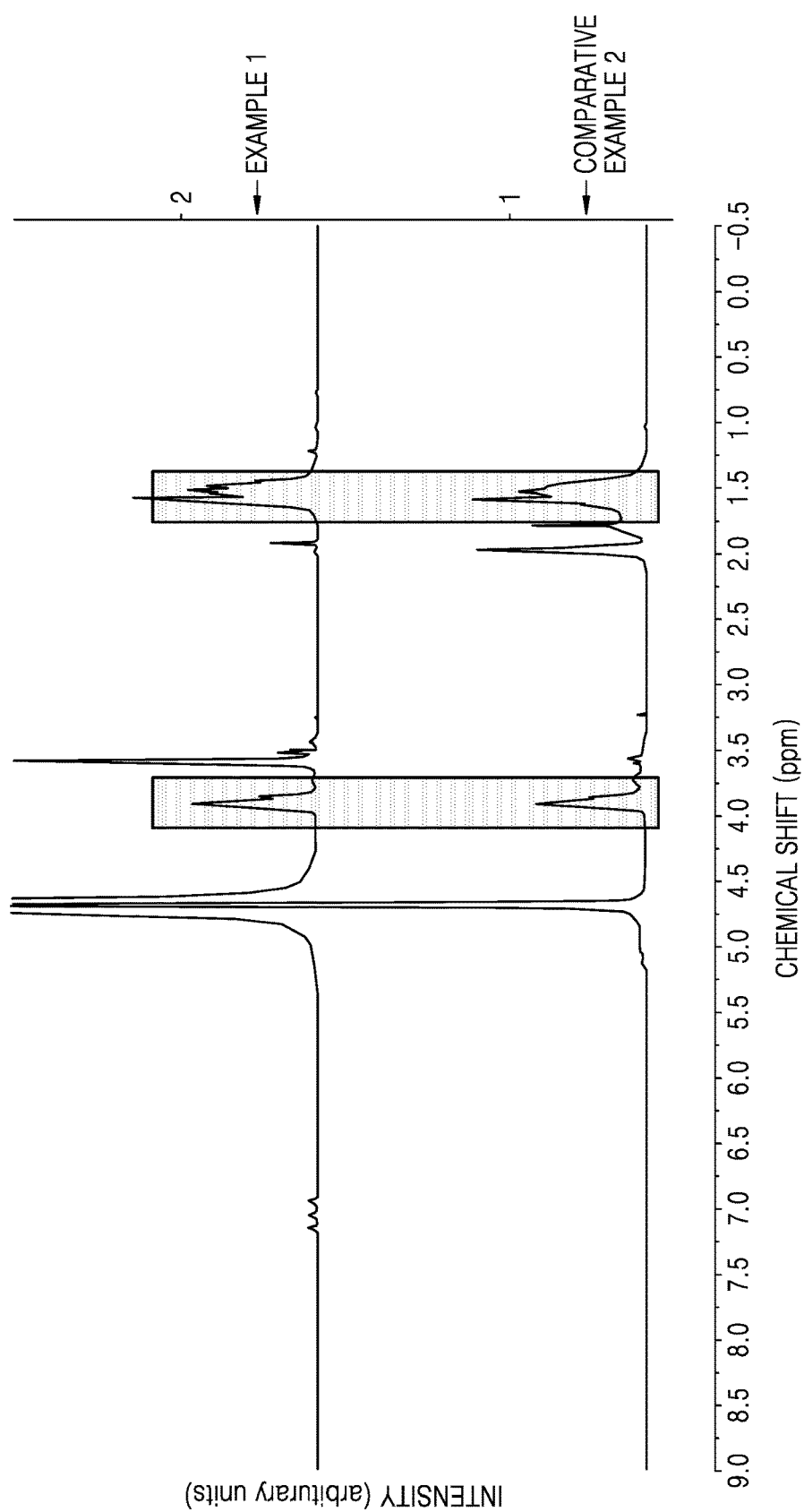
FIG. 4A is a graph of intensity (arbitrary units) versus chemical shift relative to tetramethyl silane (parts per million (ppm)) showing $^1H$ NMR spectra with respect to composite negative active materials prepared according to Example 1 and Comparative Example 2.
Figure 4B:
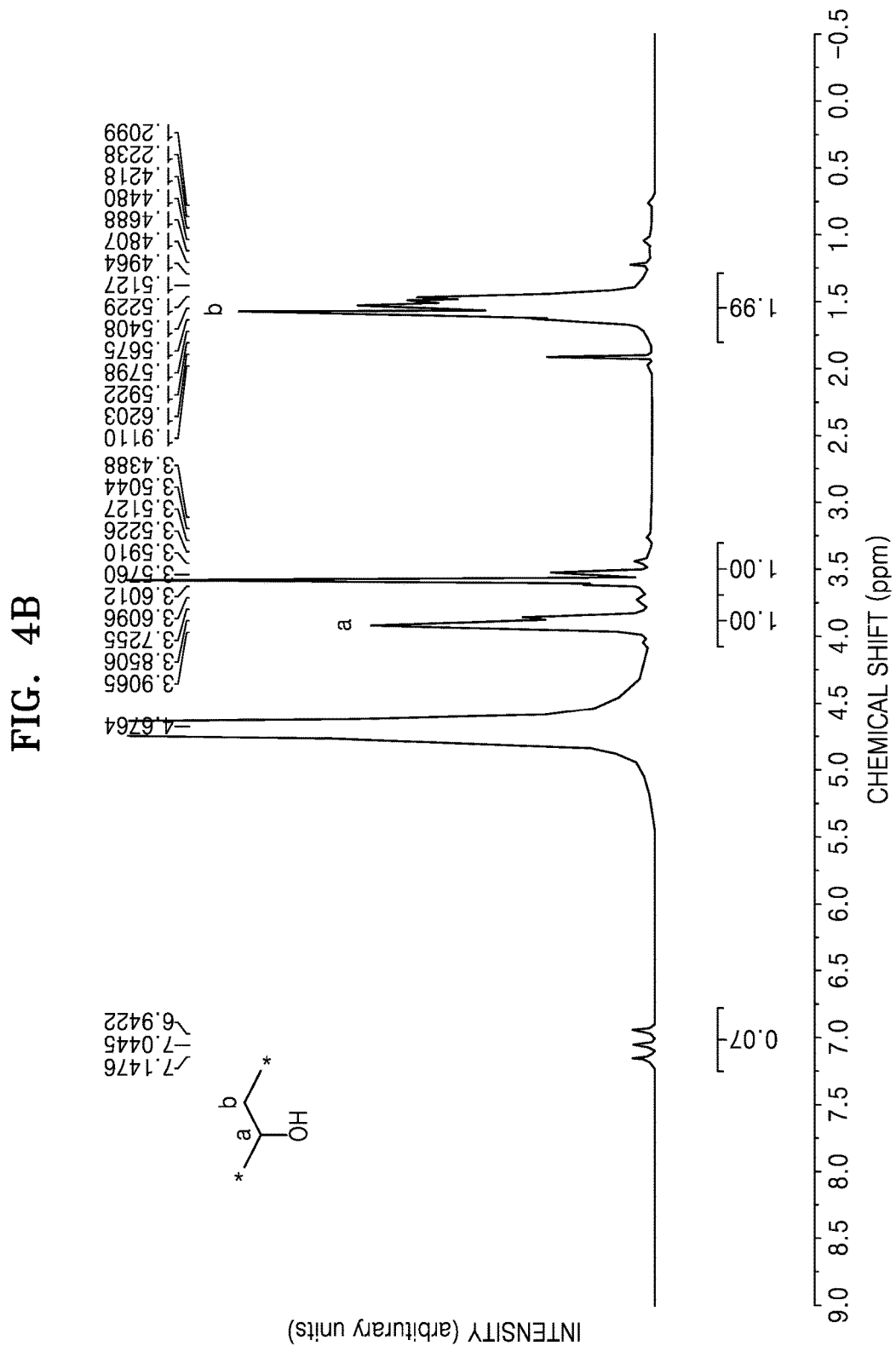
FIG. 4B is a graph of intensity (arbitrary units) versus chemical shift relative to tetramethyl silane (ppm) showing an enlarged view of the $^1H$ NMR spectrum with respect to a composite negative active material prepared according to Example 1 of FIG. 4A.
Figure 4C:
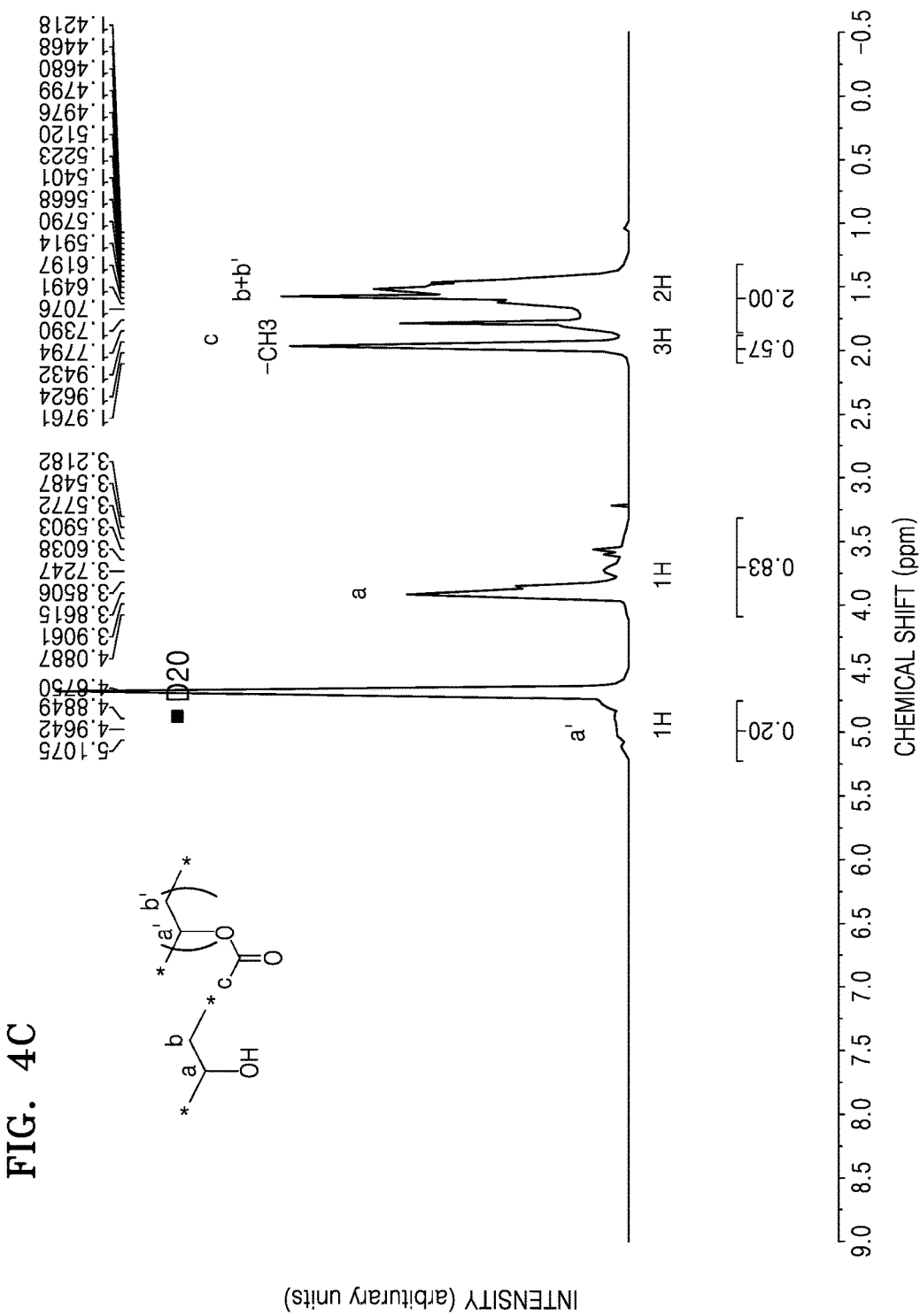
FIG. 4C is a graph of intensity (arbitrary units) versus chemical shift relative to tetramethyl silane (ppm) showing an enlarged view of the $^1H$ NMR spectrum with respect to a composite negative active material prepared according to Comparative Example 2 of FIG. 4A.

Referring to FIGS. 4A to 4C, it was confirmed that a $CH_3$ peak (i.e., c part) shown in FIG. 4C, which corresponds to an end portion of acetate, was reduced in FIG. 4B.

In addition, referring to FIG. 4D, a peak corresponding to the F anionic component was clearly observed with respect to a peak corresponding to the composite negative active material of Example 1.

Analytical Example 2

X-Ray Photoelectron Spectroscopic (XPS) Analysis—Analysis of Anionic Component Content in a Coating Layer on a Surface of a Composite Negative Active Material The composite negative active materials of Examples 1 to 3 and Comparative Example 1 were subjected to an XPS analysis. The compositional analysis results obtained from C1s, N1s, O1s, F1s, Si2p, and P2p peaks are shown in Table 1.

The XPS analysis was performed by using a Quantum 2000 (available from Physical Electronics. Inc., and having acceleration voltage in a range of about 0.5 keV to about 15 keV, a power of 300 W, an energy resolution of about 1.0 eV, a minimum analysis area of about 10 micro, and a sputter rate of about 0.1 nm/min).

TABLE 1

|  | Carbon content corresponding to a C1s peak (atomic %) | Nitrogen content corresponding to a N1s peak (atomic %) | Oxygen content corresponding to a O1s peak (atomic %) | Fluorine content corresponding to an F1s peak (atomic %) | Silicon content corresponding to a Si2p peak (atomic %) | Phosphorus content corresponding to a P2p peak (atomic %) |
|---|---|---|---|---|---|---|
| Example 1 (PVA:F$^-$ = 1:0.5) | 67.2 | 0 | 22.99 | 0.15 | 9.65 | 0 |
| Example 2 (PVA:F$^-$ = 1:1) | 68 | 0.11 | 22.72 | 0.27 | 8.89 | 0 |
| Example 3 (PVA:PO$_4^{3-}$ = 1:0.7) | 78.74 | 0.3 | 16.08 | 0 | 4.09 | 0.8 |
| Example 4 (PVA:PO$_4^{3-}$ = 1:1) | 83.82 | 0.34 | 11.9 | 0 | 2.86 | 1.08 |
| Example 5 (PVA:PO$_4^{3-}$ = 1:1.3) | 79.42 | 0.26 | 15.61 | 0 | 3.65 | 1.07 |
| Example 6 (PVA:F$^-$:PO$_4^{3-}$ = 1:0.1:0.7) | 76.29 | 0 | 18.24 | 0 | 5.01 | 0.46 |
| Example 7 (PVA:F$^-$:PO$_4^{3-}$ = 1:0.2:0.7) | 77.31 | 0 | 17.66 | 0.02 | 4.52 | 0.49 |
| Comparative Example 1 | 75.75 | 0.07 | 13.27 | 0 | 10.91 | 0 |

Referring to Table 1, it was confirmed that the fluorine contents corresponding to an F1s peak in the composite negative active material of Examples 1 and 2 were each about 0.15 atomic % and about 0.27 atomic %. In addition, it was confirmed that the phosphorus content corresponding to a P2p peak in the composite negative active material of Example 4 was about 1.08 atomic %.

However, it was confirmed that the fluorine content corresponding to an F1s peak and the phosphorus content corresponding to a P2p peak in the composite negative active material of Comparative Example 1 were both 0.

Evaluation Example 1

Charge and Discharge Test—Lifespan Characteristics

A first cycle of charging and discharging was carried out as follows: the lithium secondary batteries (coin-type cells) of Examples 11 to 17 and Comparative Examples 3 and 4 were each charged with a constant current of 0.1 C rate at room temperature (25° C.) until a voltage of the lithium secondary batteries reached about 0.01 V, and then, were each discharged with a constant current of 0.1 C rate until the voltage reached about 1.5 V ($1^{st}$ cycle). Afterwards, the lithium secondary batteries had a rest time of about 10 minutes. A second cycle of charging and discharging was carried out as follows: the lithium secondary batteries (coin-type cells) of Examples 11 to 17 and Comparative Examples 3 and 4 were each charged with a constant current of 0.5 C rate at room temperature (25° C.) until a voltage of the lithium secondary batteries reached about 0.01 V, and then, were each discharged with a constant current of 0.5 C rate until the voltage reached about 1.5 V. Afterwards, the lithium secondary batteries had a rest time of about 10 minutes (formation process).

Figure 5:
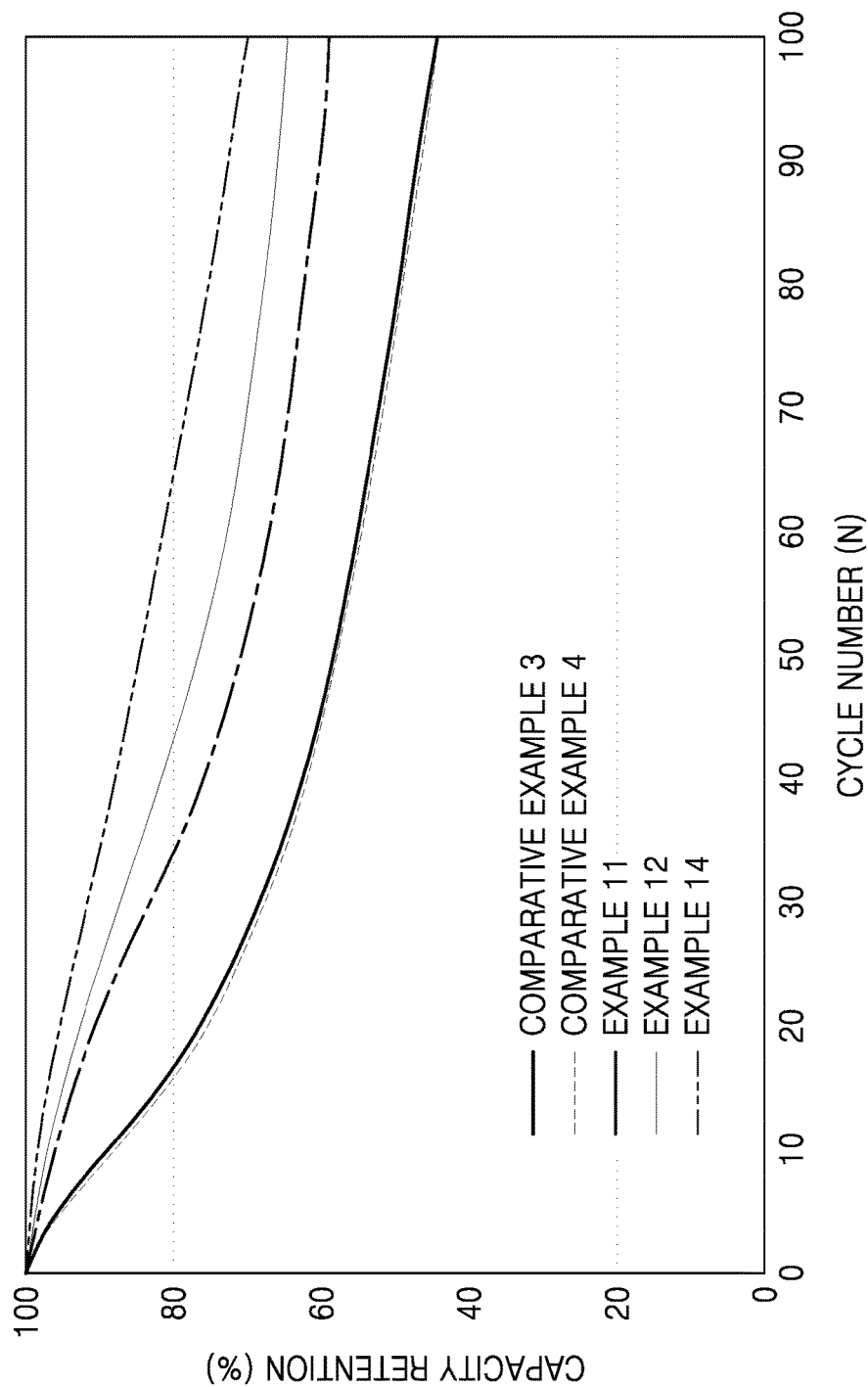
FIG. 5 is a graph showing capacity retention (percent, %) versus cycle number with respect to lithium secondary batteries prepared according to Examples 11 to 13 and Comparative Examples 3 and 4.

Subsequently, a third cycle of charging and discharging and cycles thereafter were carried out as follows: the lithium secondary batteries (i.e., coin-type cells) of Examples 11 to 17 and Comparative Examples 3 and 4 were each charged with a constant current of 1.0 C rate at room temperature (25° C.) until a voltage of the lithium secondary batteries reached about 0.01 V, and then, were each discharged with a constant current of 1.0 C rate until the voltage reached about 0.01 V. This cycle of charging and discharging was repeated a total of 100 times. The lifespan characteristics were evaluated by calculating capacity retention according to Equation 1. The evaluation results are shown in FIG. 5 and Table 2.

The term "C" used herein refers to a discharge rate of a cell, and is a value obtained by dividing the total capacity of a cell by the total discharge time.

Capacity retention rate [%]=[Discharge capacity at $100^{th}$ cycle/discharge capacity at $1^{st}$ cycle]× 100%  Equation 1

TABLE 2

|  | Capacity retention (%) |
|---|---|
| Example 11 | 58 |
| Example 12 | 64 |
| Example 13 | 60 |
| Example 14 | 70 |
| Example 15 | 69 |
| Example 16 | 69 |
| Example 17 | 71 |
| Comparative Example 3 | 44 |
| Comparative Example 4 | 44 |

Referring to FIG. 5 and Table 2, it was confirmed that the lithium secondary batteries (coin-type cells) of Examples 11 to 17 had improved capacity retention rates compared to those of the lithium secondary batteries (coin-type cells) of Comparative Examples 3 and 4.

According to the one or more exemplary embodiments as described above, a composite negative active material includes: a core including a silicon material and a coating layer disposed on the core, the coating layer including a water-insoluble polymer composite in which at least one anionic component selected from $F^-$, $PO_4^{3-}$, $PF_6^-$, $BO_3^{3-}$, and $BF_4^-$ is chemically bonded to a water-soluble polymer.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A composite negative active material comprising:
   a core comprising silicon; and
   a coating layer disposed on the core,
   wherein the coating layer comprises a water-insoluble polymer composite comprising at least one anionic component selected from $F^-$, $PO_4^{3-}$, $PF_6^-$, $BO_3^{3-}$, and $BF_4^-$, wherein the at least one anionic component is chemically bonded to a water-soluble polymer.

2. The composite negative active material of claim 1, wherein the water-soluble polymer comprises at least one selected from a polyvinyl alcohol homopolymer and a polyvinyl alcohol copolymer.

3. The composite negative active material of claim 2, wherein the polyvinyl alcohol copolymer comprises at least one selected from poly(vinyl alcohol-co-ethylene glycol), poly(vinyl alcohol-co-ethylene), poly(vinyl alcohol-co-nitrile), polyacrylonitrile-grafted polyvinyl alcohol, poly(vinyl alcohol-co-methyl methacrylate), and poly(vinyl alcohol-co-acrylic acid).

4. The composite negative active material of claim 1, wherein the coating layer comprises a water-insoluble polymer composite in which the anionic component as a part of a salt is chemically bonded to the water-soluble polymer.

5. The composite negative active material of claim 4, wherein the salt comprises at least one selected from $NH_4F$, $NH_2H_2PO_4$, $NH_4PF_6$, $(NH_4)_3BO_3$, $NH_4BF_4$, and $H_3BO_3$.

6. The composite negative active material of claim 1, wherein the coating layer is uncarbonized.

7. The composite negative active material of claim 1, wherein the core comprising the silicon comprises at least one selected from elemental silicon, a blend of silicon and carbon, a composite of silicon and carbon, and a silicon alloy.

8. The composite negative active material of claim 7, wherein the composite of silicon and carbon comprises a composite of silicon and a carbon nanotube or a composite of silicon and a carbon nanofiber.

9. The composite negative active material of claim 1, wherein an amount of the coating layer is about 5 parts by weight or less, based on 100 parts by weight of a total weight of the composite negative active material.

10. The composite negative active material of claim 1, wherein an amount of the water-soluble polymer is about 5 parts by weight or less, based on 100 parts by weight of a total weight of the composite negative active material.

11. The composite negative active material of claim 1, wherein an amount of the anionic component is about 5 parts by weight or less, based on 100 parts by weight of a total weight of the composite negative active material.

12. The composite negative active material of claim 1, wherein a molar ratio of the water-soluble polymer to the anionic component is in a range of about 1:0.2 to about 1:3.

13. The composite negative active material of claim 1, further comprising an inorganic material which is non-reactive with the core.

14. The composite negative active material of claim 13, wherein the inorganic material comprises at least one selected from $MgF_2$, $Mg_3(PO_4)_2$, $AlF_3$, $Al(PO_4)_3$, $Al_2O_3$, and MgO.

15. The composite negative active material of claim 13, wherein an amount of the inorganic material is about 5 parts by weight or less, based on 100 parts by weight of a total weight of the composite negative active material.

16. A negative electrode comprising the composite negative active material of claim 1.

17. The negative electrode of claim 16, further comprising a binder.

18. A lithium secondary battery comprising the negative electrode of claim 16.

* * * * *